United States Patent
Kliger et al.

(10) Patent No.: US 9,008,086 B2
(45) Date of Patent: *Apr. 14, 2015

(54) MAC TO PHY INTERFACE APPARATUS AND METHODS FOR TRANSMISSION OF PACKETS THROUGH A COMMUNICATIONS NETWORK

(71) Applicant: Broadcom Corporation, Irvine, CA (US)

(72) Inventors: Avraham Kliger, Ramat Gan (IL); Yitshak Ohana, Givat Zeev (IL); Moshe Tarrab, Yahud (IL)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,174

(22) Filed: Jul. 11, 2013

(65) Prior Publication Data

US 2013/0301653 A1   Nov. 14, 2013

Related U.S. Application Data

(63) Continuation of application No. 12/844,098, filed on Jul. 27, 2010, now Pat. No. 8,526,429, which is a continuation of application No. 11/924,457, filed on Oct. 25, 2007, now Pat. No. 7,782,850.

(Continued)

(51) Int. Cl.
*H04L 12/28* (2006.01)
*H04L 29/06* (2006.01)
*H04L 29/08* (2006.01)

(52) U.S. Cl.
CPC ............ *H04L 69/14* (2013.01); *H04L 12/2805* (2013.01); *H04L 69/32* (2013.01)

(58) Field of Classification Search
USPC .................................. 370/389, 463, 469, 49
See application file for complete search history.

(56) References Cited

U.S. PATENT DOCUMENTS

| 3,836,888 A | 9/1974 | Boenke et al. |
| 4,413,229 A | 11/1983 | Grant |

(Continued)

FOREIGN PATENT DOCUMENTS

| CN | 1422043 A | 6/2003 |
| CN | 1588827 A | 3/2005 |

(Continued)

OTHER PUBLICATIONS

International Search Report for Internatinal Application No. PCT/US03/27253 dated Dec. 30, 2003, 4 pgs.

(Continued)

*Primary Examiner* — Dady Chery

(74) *Attorney, Agent, or Firm* — McDermott Will & Emery LLP

(57) ABSTRACT

A communication device having a Media Access Control (MAC) layer and a physical (PHY) layer may include a first physical channel for transferring at least one packet between the PHY layer and the MAC layer. The communication device may further include a second physical channel for transferring, to a transmitting device, a first table that indicates a number of bits to be loaded onto each of a plurality of tones and a second table that indicates a transmission power for the plurality of tones. The PHY layer may receive the at least one packet from the transmitting device over the plurality of tones and may transfer the at least one packet to the MAC layer via the first physical channel.

17 Claims, 12 Drawing Sheets

Related U.S. Application Data

(60) Provisional application No. 60/940,998, filed on May 31, 2007, provisional application No. 60/907,819, filed on Apr. 18, 2007, provisional application No. 60/907,126, filed on Mar. 22, 2007, provisional application No. 60/907,111, filed on Mar. 21, 2007, provisional application No. 60/866,527, filed on Nov. 20, 2006, provisional application No. 60/866,519, filed on Nov. 20, 2006, provisional application No. 60/866,532, filed on Nov. 20, 2006.

(56) References Cited

U.S. PATENT DOCUMENTS

| | | |
|---|---|---|
| 4,536,875 A | 8/1985 | Kume et al. |
| 4,608,685 A | 8/1986 | Jain et al. |
| 4,893,326 A | 1/1990 | Duran et al. |
| 5,052,029 A | 9/1991 | James et al. |
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford, Jr. et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath et al. |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore, Jr. et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,664,065 B2 | 2/2010 | Lu |
| 7,675,970 B2 | 3/2010 | Nemiroff et al. |
| 7,860,092 B2 | 12/2010 | Yoon et al. |
| 7,916,756 B2 | 3/2011 | Atsumi et al. |
| 8,184,550 B2 | 5/2012 | Beck et al. |
| 2001/0039660 A1 | 11/2001 | Vasilevsky et al. |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger et al. |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leatherbury et al. |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1 | 1/2003 | Beckmann et al. |
| 2003/0060207 A1 | 3/2003 | Sugaya et al. |
| 2003/0063563 A1 | 4/2003 | Kowalski |
| 2003/0066082 A1 | 4/2003 | Kliger et al. |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger et al. |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0115703 A1 | 6/2005 | Lee |

(56) References Cited

U.S. PATENT DOCUMENTS

| | | |
|---|---|---|
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1* | 9/2005 | Stopler .................. 365/203 |
| 2006/0059400 A1 | 3/2006 | Clark et al. |
| 2006/0062250 A1 | 3/2006 | Payne |
| 2006/0068708 A1 | 3/2006 | Dessert et al. |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1* | 7/2007 | Un et al. .................. 380/270 |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037487 A1 | 2/2008 | Li et al. |
| 2008/0037589 A1 | 2/2008 | Kliger et al. |
| 2008/0080369 A1 | 4/2008 | Sumioka et al. |
| 2008/0089268 A1 | 4/2008 | Kinder et al. |
| 2008/0117919 A1 | 5/2008 | Kliger et al. |
| 2008/0117929 A1 | 5/2008 | Kliger et al. |
| 2008/0130779 A1 | 6/2008 | Levi et al. |
| 2008/0178229 A1 | 7/2008 | Kliger et al. |
| 2008/0189431 A1 | 8/2008 | Hyslop et al. |
| 2008/0212591 A1 | 9/2008 | Wu et al. |
| 2008/0225832 A1 | 9/2008 | Kaplan et al. |
| 2008/0238016 A1 | 10/2008 | Chen et al. |
| 2008/0259957 A1 | 10/2008 | Kliger et al. |
| 2008/0271094 A1 | 10/2008 | Kliger et al. |
| 2008/0273591 A1 | 11/2008 | Brooks et al. |
| 2008/0279219 A1 | 11/2008 | Wu et al. |
| 2008/0298241 A1 | 12/2008 | Ohana et al. |
| 2009/0010263 A1 | 1/2009 | Ma et al. |
| 2009/0063878 A1 | 3/2009 | Schmidt et al. |
| 2009/0092154 A1 | 4/2009 | Malik et al. |
| 2009/0106801 A1 | 4/2009 | Horii |
| 2009/0122901 A1 | 5/2009 | Choi et al. |
| 2009/0165070 A1 | 6/2009 | McMullin et al. |
| 2009/0217325 A1 | 8/2009 | Kliger et al. |
| 2009/0252172 A1 | 10/2009 | Hare |
| 2009/0254794 A1 | 10/2009 | Malik et al. |
| 2009/0257483 A1 | 10/2009 | French et al. |
| 2009/0279643 A1 | 11/2009 | Shusterman |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein et al. |
| 2010/0080312 A1 | 4/2010 | Moffatt et al. |
| 2010/0150016 A1 | 6/2010 | Barr |
| 2010/0158013 A1 | 6/2010 | Kliger et al. |
| 2010/0158015 A1 | 6/2010 | Wu |
| 2010/0158021 A1 | 6/2010 | Kliger et al. |
| 2010/0158022 A1 | 6/2010 | Kliger et al. |
| 2010/0162329 A1 | 6/2010 | Ford et al. |
| 2010/0174824 A1 | 7/2010 | Aloni et al. |
| 2010/0185731 A1 | 7/2010 | Wu |
| 2010/0185759 A1 | 7/2010 | Wu |
| 2010/0238932 A1 | 9/2010 | Kliger et al. |
| 2010/0246586 A1 | 9/2010 | Ohana et al. |
| 2010/0254278 A1 | 10/2010 | Kliger et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2010/0322134 A1 | 12/2010 | Wu |
| 2011/0001833 A1 | 1/2011 | Grinkemeyer et al. |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0206042 A1 | 8/2011 | Tarrab et al. |
| 2011/0310907 A1 | 12/2011 | Klein et al. |

FOREIGN PATENT DOCUMENTS

| | | |
|---|---|---|
| EP | 0385695 A2 | 9/1990 |
| EP | 0622926 A2 | 11/1994 |
| EP | 1501326 A1 | 1/2005 |
| JP | 60160231 A | 8/1985 |
| WO | 9827748 A2 | 6/1998 |
| WO | 9831133 A2 | 7/1998 |
| WO | 9935753 A2 | 7/1999 |
| WO | 9946734 A1 | 9/1999 |
| WO | 0031725 A1 | 6/2000 |
| WO | 0055843 A1 | 9/2000 |
| WO | 0180030 A1 | 10/2001 |
| WO | 0219623 A2 | 3/2002 |

OTHER PUBLICATIONS

International Search Report for International Application No. PCT/US03/27254 dated Feb. 3, 2004, 5 pgs.

Ovadia, S., "Home Networking on Coax for Video and Multimedia, Overview for IEEE 802.1AVB", Multimedia over Coax Alliance, May 30, 2007, pp. 1-15, San Ramon/California.

"Microtune Introduces Industry's First 1-GHz Cable Tuners Compatible with MoCA—Home Networking Standard", Business Wire, Mar. 19, 2007, 2 pgs., San Francisco, California.

Spangler, "MoCA Brewing Up Bigger Bandwidth", Multichannel News, Dec. 15, 2008, Interview with CTO Anton Monk, retrieved from <http://www.multichannel.com/article/160878-MoCA_Brewing_Up_Bigger_Bandwidth.php> on Mar. 29, 2009, pp. 1-2.

Ovadia, S., "MoCA: Ubiquitous Multimedia Networking in the Home," Proceedings of the SPIE—The International Society for Optical Engineering SPIE—The International Society for Optical Engineering USA, [Online] 2007, XP002584642 ISSN: 0277-0786X, Retrieved from <http://spiedl.aip.org/getpdf/servlet/getPDFServlet?filetype=pdf&id=PSISDG006776000001677600C00000&idtype=cvips&prog=normal> on Jul. 28, 2010 as cited in European Search Report.

* cited by examiner

| Interface | Signal Name | # | I/O (from point of view of PHY layer 10 (see FIG. 1)) | Description |
|---|---|---|---|---|
| Configuration 140 | SERIAL_DATA 142 in FIG. 1 | 1 | IO | Register access is initiated by MAC layer 20 with control and address bits. SERIAL_DATA is driven by MAC layer 20 for Write operations. It is driven by MAC layer 20 for control and address parts of Read operations and by the PHY layer 10 for the data part of Read operations.<br>SERIAL_DATA 142 is synchronous with PHY_CLK 134<br>SERIAL_DATA '1' is HIGH. |
| Data 110 | MPD_DATA [7:0] 112 in FIG. 1 | 8 | IO | MPD_DATA[7:0] is an 8-bit wide data bus used for MoCA interframe ('IF') data transmit and receive.<br>In MPD_TX high the bus direction is MAC to PHY in MPD_RX high the direction is PHY to MAC<br>MPD_DATA[7:0] '1' is HIGH. |
| | MPD_TX 116 in FIG.1 | 1 | O | MPD_TX is used to put the MPD_DATA 112 in transmit of data from MAC to the PHY.<br>The MPD_TX 116 temporally bounds each TX brust<br>MPD_TX is synchronous to PHY_CLK 134.<br>MPD_TX is ACTIVE HIGH. |
| | MPD_RX 118 in FIG. 1 | 1 | O | MPD_RX is used to put MPD_DATA 112 in receive for data from PHY 10 to MAC layer 20.<br>MPD_RX is set at the start of the first data symbol received on the medium, and cleared at the transmission of the last byte of the RX burst on MPD_DATA 112.<br>MPD_RX is synchronous to PHY_CLK 134.<br>MPD_RX is ACTIVE HIGH. |
| | MPD_DATA_EN 114 in FIG. 1 | 1 | O | In MPD_TX=1, this signal is used by the PHY to request more data from the MAC. In MPD_RX=1, it is used to indicate to the MAC that there is valid data on the DATA bus.<br>MPD_DATA_EN is synchronized to PHY_CLK 134.<br>MPD_DATA_EN is ACTIVE HIGH. |

FIG. 2A

| Interface | Signal Name | # | I/O (from point of view of PHY layer 10 (see FIG. 1)) | Description |
|---|---|---|---|---|
| Management 120 | MNG_DATA [3:0] 122 in FIG. 1 | 4 | IO | MNG_DATA[3:0] is an 3-bit wide data bus used for PHY layer 10 management data. <br> If MNG_DIR=1 the data bus direction is from PHY to MAC <br> IF MNG_DIR=0 the data bus direction is from MAC to PHY <br> MNG_DATA[3:0] '1' is HIGH. |
| | MING_DATA_EN 126 in FIG. 1 | 1 | O | In MNG_DIR=0, this signal is used by the PHY to request more data from the MAC. In MNG_DIR=1, it is used to indicate to the MAC that there is valid data on MPD_BUS 110. <br> MNG_DATA_EN 126 is synchronized to PHY_CLK 134. <br> MNG_DATA_EN is ACTIVE HIGH. |
| | MNG_DIR 124 in FIG. 1 | 1 | O | Indicates the direction of the parameter path. <br> 0 - MAC to PHY. <br> 1 - PHY to MAC. |
| Control 130 | PHY_CLK 134 in FIG. 1 | 1 | O | PHY clock. It is the line sample clock. <br> In normal mode the clock is 50MHz <br> In Turbo mode the clock is 100MHz <br> In hybrid mode the clock is 75 MHz |
| | PHY_STRT 132 in FIG. 1 | 1 | I | The PHY_STRT triggers PHY layer 10 for RX and TX bursts. <br> The PHY_STRT is synchronous to PHY_CLK 134. |

FIG. 2B

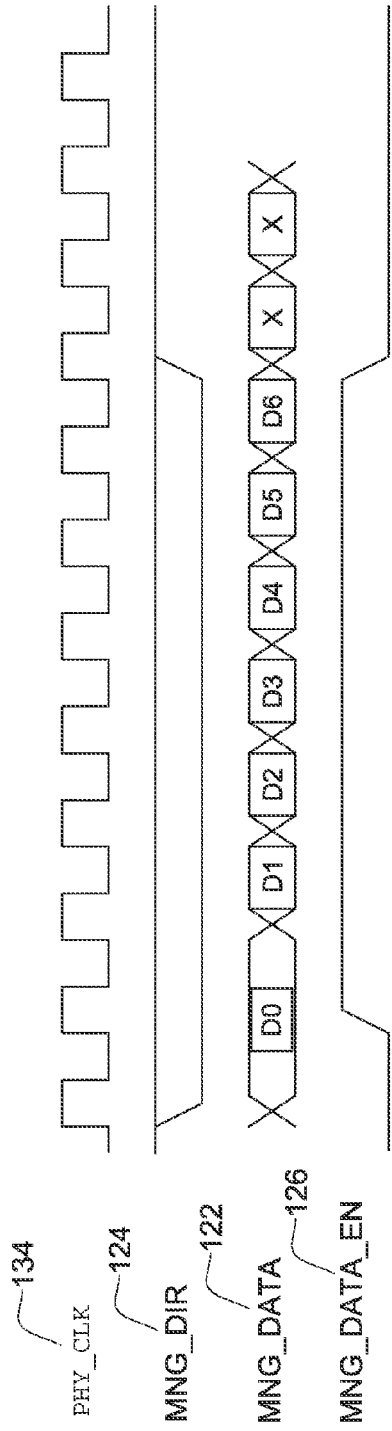

| Name | Verbose Name | Description |
|---|---|---|
| ADC delay | Analog to Digital Converter | The ADC delay |
| AFE to FFT | Analog Front End to FFT | From last symbol sample to last byte write to the FFT buffer |
| FFT | Fast Fourier Transform | From last sample written to FFT buffer to FFT buffer ready to read |
| Pilot | Pilot Tones | From FFT buffer ready to pilot process finish |
| FFT to R-S | | From first sample reading from the FFT buffer to first byte write to the R-S buffer |
| R-S | Reed-Solomon error correction | From first byte input to CW ready |
| DES | Data Encryption Standard encryption | From the first byte read by DES to first byte write by DES |
| DES to MPI | DES to Message Passing Interface | From the first byte of the last symbol reading from the DES to the last byte write to the MPI |

FIG. 13

| Name | Verbose Name | Description |
|---|---|---|
| MPI to DES | See FIG. 13. | From the first byte of the first symbol write to the MPI to the last byte of the symbol |
| DES | See FIG. 13. | From the first byte read by DES to first byte write by DES |
| R-S | See FIG. 13. | From any byte read by the R-S to write it plus the parity bytes write by the R-S |
| To IFFT | | From any byte read from the R-S to write it to the IFFT buffer |
| IFFT | Inverse Fast Fourier Transform | From last sample written to IFFT buffer to FFT buffer ready to read |
| To AFE | See FIG. 13. | From the IFFT to the DAC |

FIG. 14

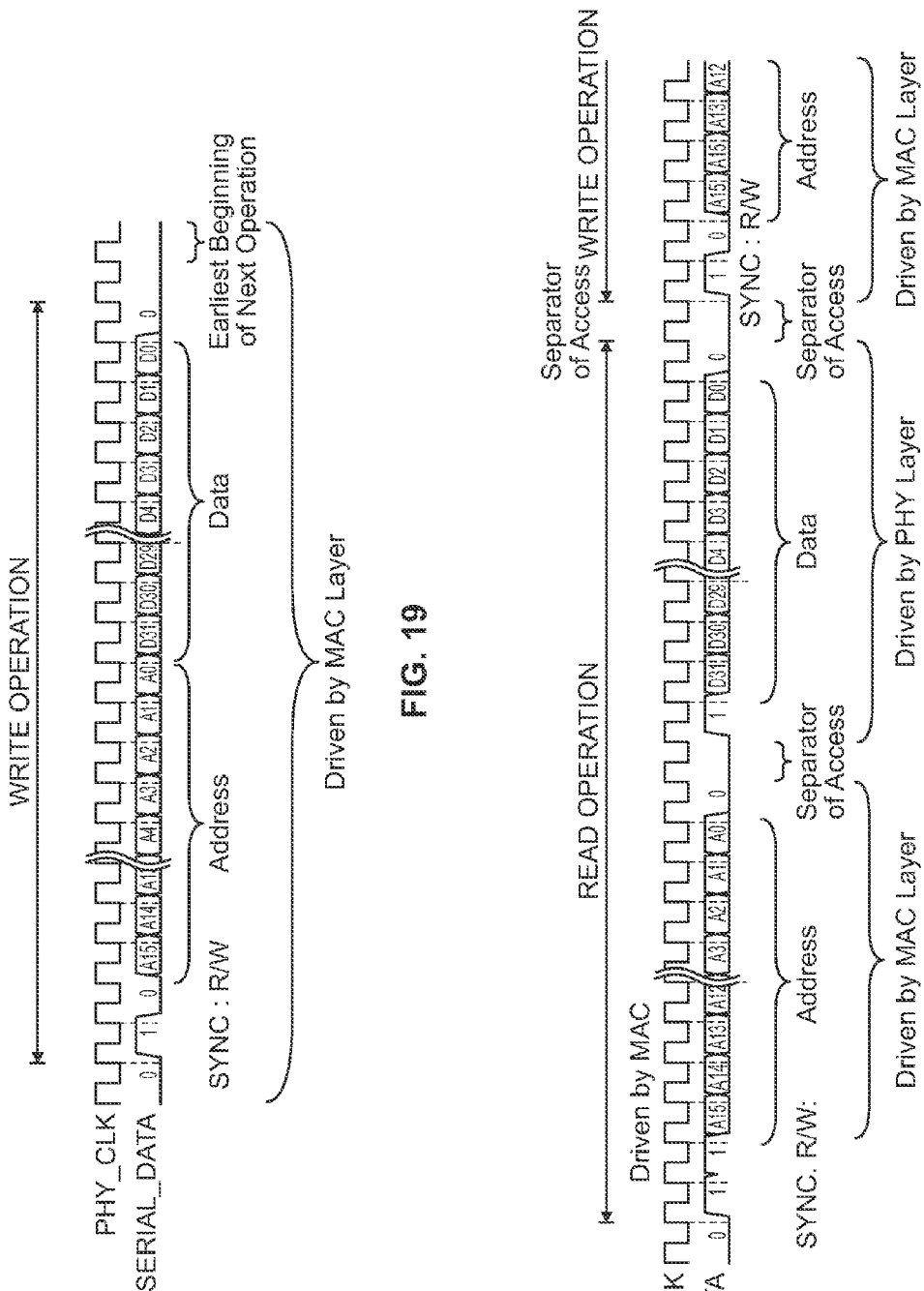

MAC TO PHY INTERFACE APPARATUS AND METHODS FOR TRANSMISSION OF PACKETS THROUGH A COMMUNICATIONS NETWORK

CROSS-REFERENCE TO OTHER APPLICATIONS

This application is a continuation of U.S. patent application Ser. No. 12/844,098, filed Jul. 27, 2010, now U.S. Pat. No. 8,526,429, entitled "MAC TO PHY INTERFACE APPARATUS AND METHODS FOR TRANSMISSION OF PACKETS THROUGH A COMMUNICATIONS NETWORK," which is a continuation of U.S. patent application Ser. No. 11/924,457, filed Oct. 25, 2007, now U.S. Pat. No. 7,782,850, entitled "MAC TO PHY INTERFACE APPARATUS AND METHODS FOR TRANSMISSION OF PACKETS THROUGH A COMMUNICATIONS NETWORK," both of which are hereby incorporated by reference herein in their entireties. U.S. patent application Ser. No. 11/924,457 is a nonprovisional of the following U.S. Provisional Applications, all of which are hereby incorporated by reference herein in their entireties: U.S. Provisional Application No. 60/866,532, entitled, "A METHOD FOR PACKET AGGREGATION IN A COORDINATED HOME NETWORK", filed on Nov. 20, 2006, U.S. Provisional Application No. 60/866,527, entitled, "RETRANSMISSION IN COORDINATED HOME NETWORK" filed on Nov. 20, 2006, U.S. Provisional Application No. 60/866,519, entitled, "IQ IMBALANCE CORRECTION USING 2-TONE SIGNAL IN MULTI-CARRIER RECEIVERS", filed on Nov. 20, 2006, U.S. Provisional Application No. 60/907,111, entitled, "SYSTEM AND METHOD FOR AGGREGATION OF PACKETS FOR TRANSMISSION THROUGH A COMMUNICATIONS NETWORK" filed on Mar. 21, 2007, U.S. Provisional Application No. 60/907,126, entitled, "MAC TO PHY INTERFACE APPARATUS AND METHODS FOR TRANSMISSION OF PACKETS THROUGH A COMMUNICATIONS NETWORK", filed on Mar. 22, 2007, U.S. Provisional Application No. 60/907,819, entitled "SYSTEMS AND METHODS FOR RETRANSMITTING PACKETS OVER A NETWORK OF COMMUNICATION CHANNELS", filed on Apr. 18, 2007, and U.S. Provisional Application No. 60/940,998, entitled "MOCA AGGREGATION", filed on May 31, 2007.

FIELD OF THE INVENTION

The present invention relates generally to information networks and specifically to transmitting information such as media information over communication lines such as coax, thereby to form a communications network.

BACKGROUND

Many structures, including homes, have networks based on coaxial cable ("coax").

The Multimedia over Coax Alliance ("MoCA™"), provides at its website (www.mocalliance.org) an example of a specification (viz., that available under the trademark MoCA 1.0, which is hereby incorporated herein by reference in its entirety) for networking of digital video and entertainment information through coaxial cable. The specification has been distributed to an open membership.

Technologies available under the trademark MoCA, other specifications and related technologies ("the existing technologies") tap into the vast amounts of unused bandwidth available on the coax. For example, coax has been installed in more than 70% of homes in the United States. Some homes have existing coax in one or more primary entertainment consumption locations such as family rooms, media rooms and master bedrooms. MoCA™ technology allows homeowners to utilize installed coax as a networking system and to deliver entertainment and information programming with high quality of service ("QoS").

The existing technologies provide high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Networks based on the existing technologies can be used as a backbone for multiple wireless access points to extend the reach of wireless service in the structure.

Existing technologies provide a consistent, high throughput, high quality connection through the existing coaxial cables to the places where the video devices currently reside in the home without affecting other service signals that may be present on the cable. The existing technologies provide a link for digital entertainment, and may act in concert with other wired and wireless networks to extend entertainment throughout the structure.

The existing technologies work with access technologies such as asymmetric digital subscriber lines ("ADSL"), very high speed digital subscriber lines ("VDSL"), and Fiber to the Home ("FTTH"), which provide signals that typically enter the structure on a twisted pair or on an optical fiber, operating in a frequency band from a few hundred kilohertz to 8.5 MHz for ADSL and 12 MHZ for VDSL. As services reach such a structure via any type of digital subscriber line ("xDSL") or FTTH, they may be routed via the existing technologies and the coax to the video devices. Cable functionalities, such as video, voice and Internet access, may be provided to the structure, via coax, by cable operators, and use coax running within the structure to reach individual cable service consuming devices in the structure. Typically, functionalities of the existing technologies run along with cable functionalities, but on different frequencies.

The coax infrastructure inside the structure typically includes coax, splitters and outlets. Splitters typically have one input and two or more outputs and are designed to transmit signals in the forward direction (input to output), in the backward direction (output to input), and to isolate outputs from different splitters, thus preventing signals from flowing from one coax outlet to another. Isolation is useful in order to a) reduce interference from other devices and b) maximize power transfer from Point Of Entry ("POE") to outlets for best TV reception.

Elements of the existing technologies, such as that available under the trademark MoCA, are specifically designed to propagate backward through splitters ("insertion") and from output to output ("isolation"). One outlet in a structure can be reached from another by a single "isolation jump" and a number of "insertion jumps." Typically isolation jumps have an attenuation of 5 to 40 dB and each insertion jump attenuates approximately 3 dB. MoCA™ technology has a dynamic range in excess of 55 dB while supporting 200 Mbps throughput. Therefore MoCA™ technology can work effectively through a significant number of splitters.

Managed network schemes, such as MoCA™ technology, are specifically designed to support streaming video without packet loss providing very high video quality between outlets.

Because digital cable programming is delivered to a structure with a threshold Packet Error Rate ("PER") below 1 per million, programming transmitted from outlet to outlet within the structure should have a similar or better error rate so as to provide similar viewability. It would therefore be desirable to provide systems and methods for communicating information over the coax in structure networks.

SUMMARY

There is thus provided, in accordance with the principles of the invention, a system servicing an individual node in a shared communication network having a MAC layer and a PHY layer, the system being operative to interface between the MAC layer and the PHY layer, the system comprising a first physical channel transferring at least one packet between the layers, a second physical channel transferring at least one burst parameter between the layers, and a third physical channel transferring at least one timing signal, for a burst characterized by the at least one burst parameter and comprising the at least one packet, between the layers.

Further in accordance with a preferred embodiment of the present invention, the timing signal comprises an indication, provided by the MAC layer to the PHY layer, of a time at which to transmit at least one burst.

Still further in accordance with a preferred embodiment of the present invention, the timing signal comprises an indication, provided by the MAC layer to the PHY layer, of a time at which to receive at least one burst.

Additionally in accordance with a preferred embodiment of the present invention, the at least one burst parameter is transferred before the burst, from the MAC layer to the PHY layer.

Further in accordance with a preferred embodiment of the present invention, at least one burst parameter comprises at least one status parameter of the burst transferred after the burst, from the PHY layer to the MAC layer.

Additionally, in accordance with a preferred embodiment of the present invention, at least one burst parameter comprises at least one reception configuration attribute of the burst.

Further in accordance with a preferred embodiment of the present invention, at least one burst parameter comprises at least one transmission configuration attribute of the burst.

Still further in accordance with a preferred embodiment of the present invention, the second physical channel is operative to transfer, from the PHY layer to the MAC layer, an indication of the PHY layer's extent of interest in different types of status parameters.

Additionally in accordance with a preferred embodiment of the present invention, the second physical channel comprises a multi-standard pre-processor operative to pre-process, for transfer from layer to layer, at least one burst parameter formatted in accordance with any of a plurality of access mode-defining standards.

According to some communication standards, transmission of information between the PHY layers of various nodes in a network, which may include, say, up to dozens of nodes, is multitone. Some of these standards include, for each individual node N1 in the network, and for each node with which the individual node N wishes to interact (receive ("RX") from or transmit ("TX") to) Tx and Rx bit loading tables. Node $N_i$'s TX bit loading table for a particular node $N_n$ defines for each of a plurality of tones such as 256 or 512 tones, the number of bits to be loaded on that tone when transmitting to node $N_n$. Node $N_i$'s RX bit loading table for a particular node $N_n$ defines for each of a plurality of tones such as 256 or 512 tones, the number of bits loaded on that tone when receiving from node $N_n$. The key accessing these tables is present in the MAC layer.

Further in accordance with a preferred embodiment of the present invention, the system also comprises at least one bit-loading table stored externally to the PHY layer.

Still further in accordance with a preferred embodiment of the present invention, the second physical channel is operative to transfer an individual bit-loading table, characterizing a pair of nodes including a Tx node and an Rx node, to a PHY layer of at least one of the Tx node and the Rx node when the nodes are preparing to communicate with one another.

Further in accordance with a preferred embodiment of the present invention, the second physical channel is operative to transfer at least one item of information regarding a burst, other than contents of packets included in the burst and other than an indication of a time at which to transmit the burst.

Still further in accordance with a preferred embodiment of the present invention, the timing signal comprises an alert, provided by the PHY layer to the MAC layer, that a burst has been received.

Further in accordance with a preferred embodiment of the present invention, the system also comprises at least one gain-per-tone table stored externally to the PHY layer.

According to some communication standards, transmission of information between the PHY layers of various nodes in a network, which may include, say, up to dozens of nodes, is multitone. Some of these standards include, for each individual node N in the network, a gain-per-tone table defining the transmission power for each of a plurality of tones such as 256 or 512 tones when node N transmits to other nodes. The key accessing these tables is present in the MAC layer.

Further in accordance with a preferred embodiment of the present invention, the second physical channel is operative to transfer an individual gain-per-tone table, characterizing an individual Tx node, to the PHY layer of the Tx node.

Still further in accordance with a preferred embodiment of the present invention, at least one status parameter transferred after the burst may include at least one of the following: SNR information characterizing the burst; and channel response information characterizing the burst.

Further in accordance with a preferred embodiment of the present invention, the second physical channel transfers information characterizing a configuration of an individual burst while at least one packets of a burst previous to the individual burst are still traversing the first physical channel, thereby to shorten an inter-frame gap defined between the individual burst and the previous burst.

Also provided, in accordance with the principles of the invention, is a method for operating an individual node in a shared communication network having a MAC layer and a PHY layer, the method being operative to interface between the MAC layer and the PHY layer, the method comprising transferring at least one packet between the layers over a first physical channel, transferring at least one burst parameter between the layers over a second physical channel; and transferring at least one timing signal, for a burst characterized by the at least one burst parameter and comprising the at least one packet, between the layers over a third physical channel.

Further in accordance with a preferred embodiment of the present invention, the burst to be transmitted from the individual node to another node.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 2A-2B, taken together, form a table describing the signals of FIG. 1 from the PHY's point of view in accordance with principles of the invention;

FIG. 3 is a MAC to PHY Timing Diagram describing preferred timing from the MAC of FIG. 1 to the PHY of FIG. 1 in accordance with principles of the invention;

FIG. 4 is a diagram of several operation states for the PHY of FIG. 1 in accordance with principles of the invention;

FIG. 5 is a table of parameters for the PHY layer of FIG. 1 in accordance with principles of the invention;

FIGS. 13-16 are tables and timing diagrams which together illustrate features of exemplary embodiments of a portion of the interface of FIG. 1 in accordance with principles of the invention;

FIGS. 17-20 are timing diagrams which together illustrate one implementation of a portion of the interface of FIG. 1 in accordance with principles of the invention.

DETAILED DESCRIPTION OF PREFERRED EMBODIMENTS

Figure 1:
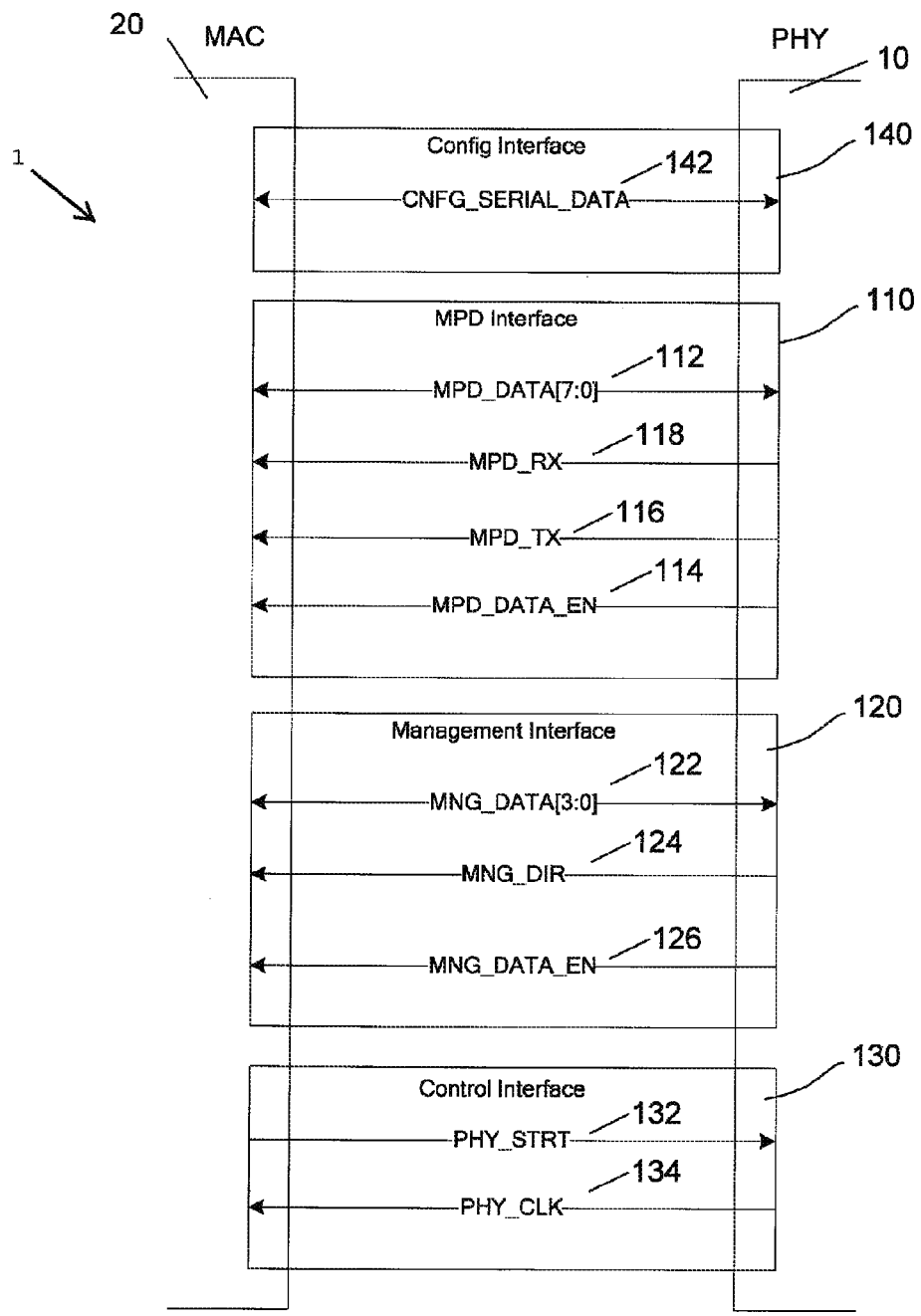
FIG. 1 is a simplified functional block diagram of a MAC-PHY interface, constructed and operative in accordance with principles of the invention, in a single device configuration.

FIG. 1 shows illustrative MAC-PHY interface 1, constructed and operative in accordance with principles of the invention, in a single device configuration. Interface 1 may be a MoCA™ technology MAC-PHY Interface ("MPI"), which is typically built in a modular way to support communication between PHY layer 10 and MAC layer 20, which are in communication with different devices.

Interface 1 includes MAC Protocol Data ("MPD") interface 110, which may include 8-bit data bus 112, management interface 120, which may include 4-bit data bus 122, control interface 130 and configuration interface 140. Interface 110 may be used to transfer data from and to MAC 20. Management interface 120 may be used to transmit burst initial parameters and to receive RX burst result parameters. Control interface 130 may be used for PHY operations and for burst arrival time. Interface 140 may be used to configure PHY layer 10.

FIGS. 2A-2B, taken together, form a table showing attributes of illustrative signals that may be communicated by interface 1 (see FIG. 1) from the point of view of PHY layer 10 (i.e., signals designated as input ("I") are sourced in MAC layer 20 and are inputs with respect to PHY layer 10.

A CPU in communication with MAC layer 20 may use interface 1 to accesses PHY layer 10 through MAC layer 20 (see FIG. 1). The CPU may do so via a serial interface for configuration, initialization and debug. A configuration port may use the PHY_CLK 134 (see FIG. 1) signal as a serial clock. A protocol is typically defined in connection with the serial interface to allow read and write access.

Management interface 120 is a channel through which MAC layer 20 may configure PHY layer 10, typically with MoCA™ burst parameters, and receive from PHY layer 10 burst results and status.

FIG. 3 shows a MAC to PHY Timing Diagram showing timing from MAC layer 20 to PHY layer 10. MNG_DIR signal 124 may be used to set the direction of data transfer.

MPD interface 110 may be used to transfer RX/TX data.

FIG. 4 shows several operation states, such as Reset, Standby and Active in which PHY layer 10 may operate. In Reset, PHY layer 10 and MAC layer 20 typically drive their signals to inactive values. The Reset signal is not part of the MAC-PHY interface apparatus shown and described herein. Standby is the state of the PHI layer 10 when PHI layer 10 is not active in either RX or TX. In Standby, PHY layer 10 reduces power consumption by turning unnecessary functions off. However, the parameters registers are typically left active for read and write. PHY layer 10 enters the Active state upon PHY_STRT 132 (see FIG. 1) assertion and remains in that state until the burst process ends. In Active, paths MPD_TX 116 and/or MPD_RX 118 (see interface 110 in FIG. 1) may be active. Both MPD_TX 116 and MPD_RX 118 could be active if and when TX follows RX and RX is still not finished when TX starts. In Active, the only active path is on. The other path should be off.

FIG. 5 shows illustrative parameters, which may include both capability and dynamic parameters, of PHY layer 10 (see FIG. 1). The parameters may be based on a vendor specific implementation. PHY layer 10 dynamic parameters are preferably separate from burst parameters and configuration parameters. The burst parameters may be changed in connection with every burst and the configuration parameters may be changed during the operation of interface 1 (see FIG. 1) and may affect the operation of PHY layer 10. Burst parameters may be accessed via management interface 120 and configuration parameters via the configuration interface 140.

Figure 6:
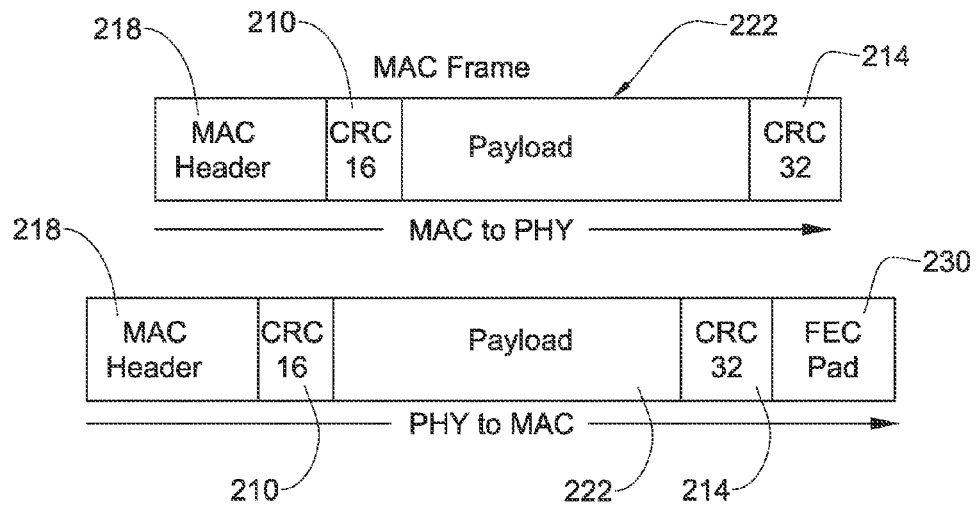
FIG. 6 is a diagram showing a preferred structure for data passing between the MAC and PHY over the MAC Protocol Data ("MPD") interface in FIG. 1.

FIG. 6 shows that data passing between MAC layer 20 and PHY layer 10 over MPD interface 140 may comprise illustrative MAC frame 200, which may include CRCs 210 and 214 for header 218 and payload 222, respectively. Forward error correction ("FEC") padding 230 is typically added by PHY layer 10. In MoCA™ RX (PHY to MAC), typically, a FEC pad such as 230 is transferred over an MPD interface such as 140 and a MAC layer such as 20 de-pads the FEC pad.

Figure 7:
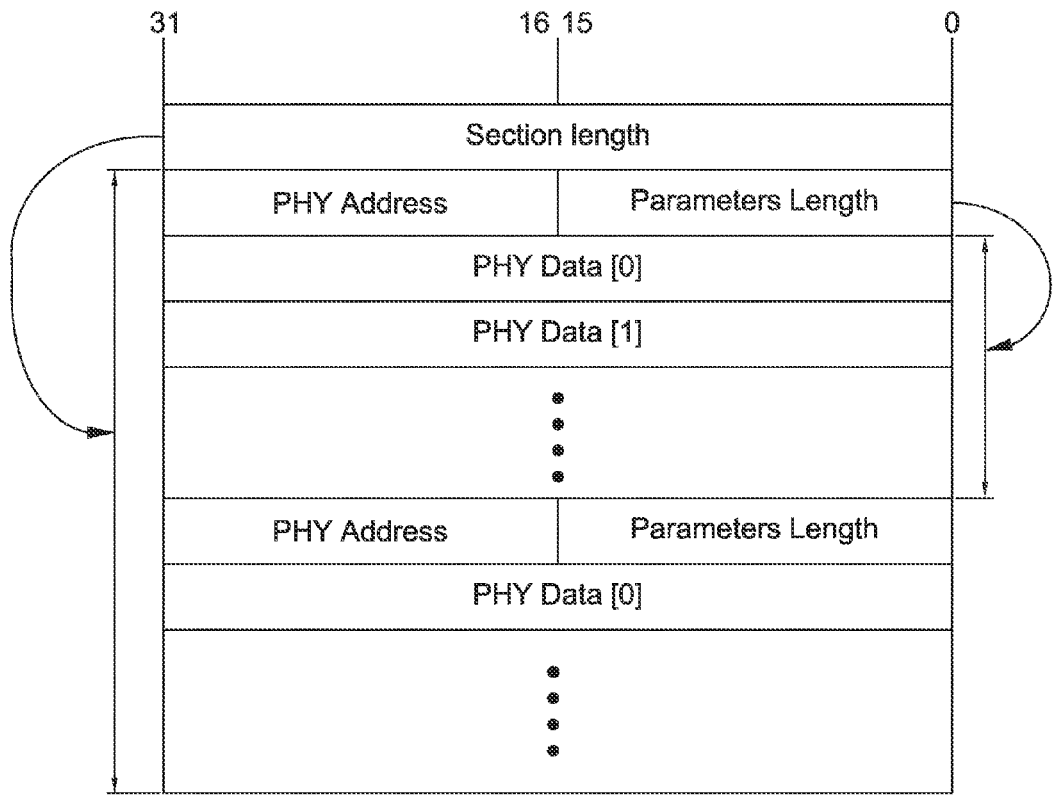
FIG. 7 is a diagram of a burst initialization parameters structure in accordance with principles of the invention.

FIG. 7 shows an illustrative format for passing data over management interface 120 (see FIG. 1). The format typically includes a variable parameters list. Different parameters are typically initiated according to TX, RX and the burst type. The data may start with a 32-bit section length and a list of parameters, e.g. as shown in FIG. 7.

Figure 8:
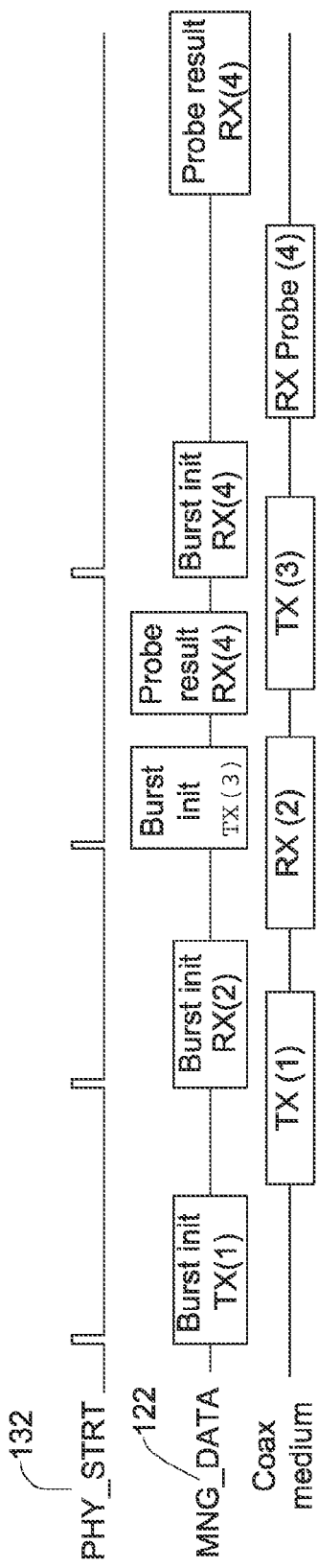
FIG. 8 is a preferred timing diagram for a preferred mode of operation for the interface apparatus of FIG. 1.

FIG. 8 shows an illustrative mode of operation for interface 1 (see FIG. 1). Before each RX or TX burst, MAC layer 20 typically sends to PHY layer 10, via MNG_DATA bus 122, parameters that are to be used by PHY layer 10 for transmitting or receiving. After the RX burst, PHY layer 10 typically sends to MAC layer 20 RX burst parameters that typically include receive burst status, RX learning parameters and, in the probe, the probe result.

Figure 9:
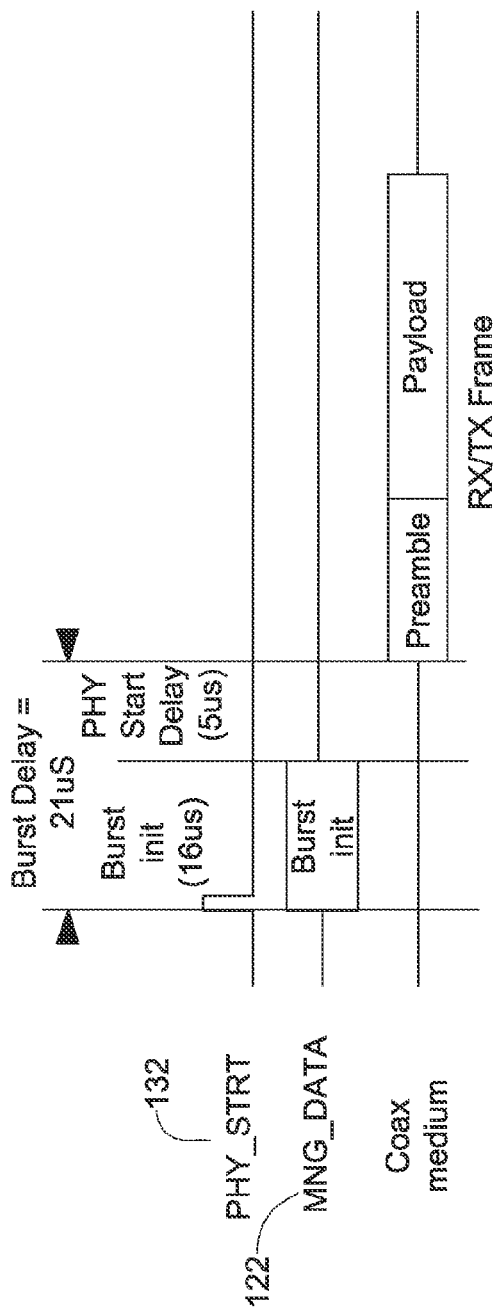
FIG. 9 is a timing diagram for a burst initialization in accordance with principles of the invention.

FIG. 9 shows an illustrative burst initialization ("burst init"). PHY_STRT 132 is typically asserted at Burst Delay time before the first symbol of the preamble present at the coax. A first part of the Burst Delay time may be used by MAC layer 20 to send burst init parameters. A second part of the Burst Delay Time may be used for PHY layer 10 delay from the burst init end to the first symbol of the preamble being present at the coax. In the RX burst, PHY layer 10 typically starts acquisition at the end of the Burst Delay. Upon PHY_STRT 132 assertion, PHY layer 10 may start reading burst parameters from MAC layer 20 even while RX results are being sent. Burst init time typically allows 400 bytes of burst parameters to be sent to PHY layer 10 before the burst. The PHY layer 10 start delay may be 5 microseconds ("uS" or "µS") so as to provide increased pre-burst preparation time.

Figure 10:
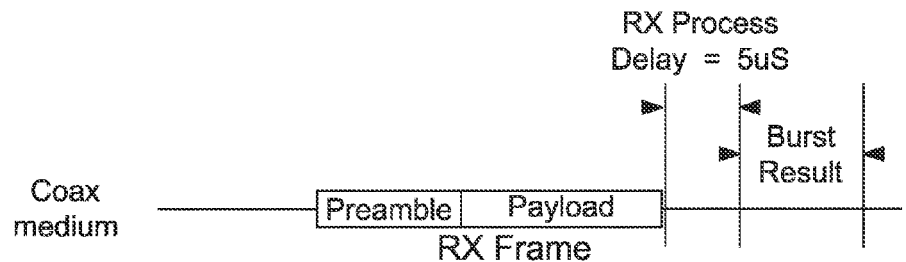
FIG. 10 is a diagram of receive ("RX") burst result timing in accordance with principles of the invention.
Figure 11:
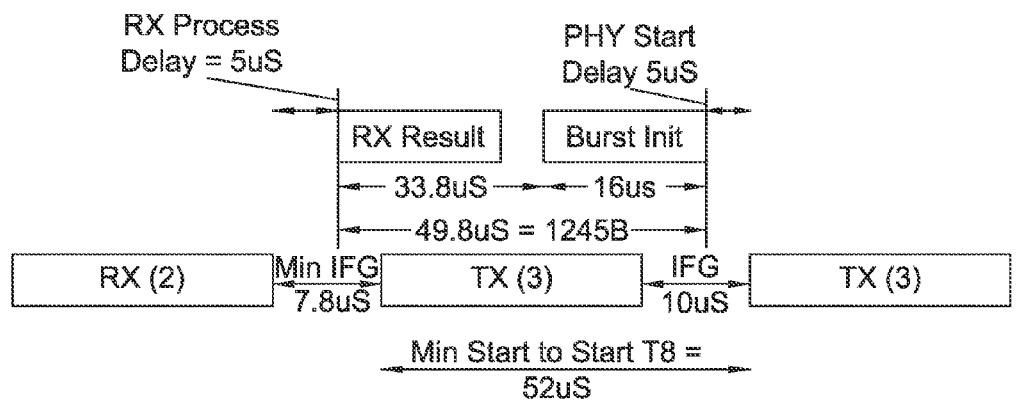
FIG. 11 is a diagram of RX result budget time in accordance with principles of the invention.
Figure 12:
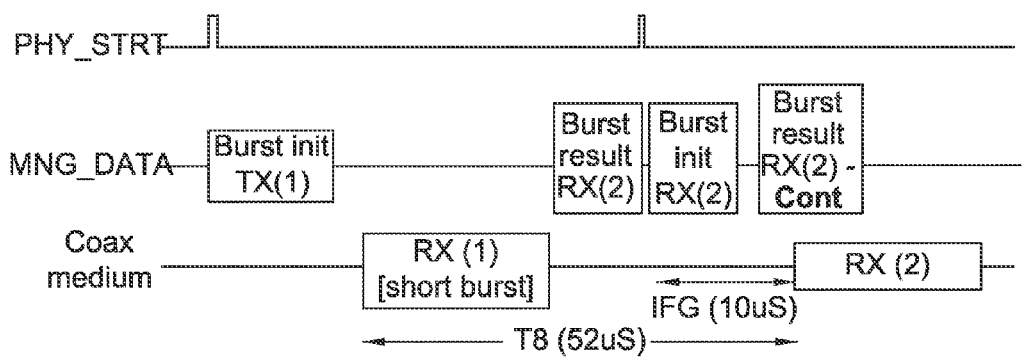
FIG. 12 is a timing diagram of a burst initialization interrupting an RX burst result, in a system constructed and operative in accordance with principles of the invention.

FIG. 10 shows that PHY layer 10 may begin sending RX burst results after an RX process delay end time. RX Process Delay time is typically measured from the end of the last symbol on the coax to the maximum delay to process the RX burst. FIG. 11 shows that the maximum time for sending RX result parameters may be 33.8 µS (845B). FIG. 12 shows that RX burst results may be interrupted by burst init.

FIGS. 13-16 show illustrative features of an illustrative data interface such as MPD interface 110 (see FIG. 1).

The MPD interface 110 of FIG. 1 typically comprises a data bus such as MPD_DATA bus 112, a data enable signal such as MPD_DATA_EN signal 114, and TX/RX signals such as MPD_TX signal 116 and MPD_RX signal 118. Signals 116 and 118 typically define the direction of data bus 112 and typically are not active together. MPD_RX signal 118 typically finishes transferring to MAC layer 20 before MPD_TX 116 is sent. The tail of MPD_RX signal 118 may be transmitted over the MPD_DATA 112 during the preamble of the next TX burst start transmit.

A medium data gap ("MDG") is defined herein as the time, as measured at the coax, between the end of an RX last symbol and a first symbol of the TX payload. During the gap, all RX data is typically transferred to MAC layer 20 and enough data is read for transmission after the preamble ends. In some embodiments, the MDG may be 21.52 us in 50 MHz bandwidth, but any suitable MDG may be used. In some embodiments, the MDG may be 14.66 in turbo mode (100 MHz), but any suitable MDG may be used. The MDG typically comprises the minimum inter-frame gap ("IFG") of 7.8 us (10 us-2.2 us) and minimum preamble time. In some embodiments, at 50 MHz bandwidth, the minimum preamble time (the minimal-size preamble, "P4," size with the minimum allowed cyclic prefix, "CP," size of 10 samples) may be 13.72 us, but any suitable minimum preamble time may be used. In some embodiments, in turbo mode the time may be 6.86 us, but any suitable minimum preamble time may be used.

A medium symbol gap ("MSG") is defined as the time, as measured at the coax, between the end of an RX last symbol and a first symbol from a device (e.g., a consumer electronics ("CE") device). During the gap, a FFT machine typically finishes processing the last RX symbol, an IFFT typically finishes the CE symbol processing and the first CE sample is typically present on the medium at the end of the preamble. In some embodiments, at 50 MHz bandwidth, the MSG may be 9.08 us, but any suitable MSG may be used. In some embodiments, in turbo mode (100 MHz), the MSG may be 8.44, but any suitable MSG may be used. The MSG typically comprises the minimum IFG of 7.8 us (10 us-2.2 us) and a short preamble time. In some embodiments, at, 50 MHz bandwidth, the short preamble time may be 1.28 us (L2), but any short preamble time may be used. In some embodiments, in turbo mode the time may be 0.64 us, but any short preamble time may be used.

IFG (see FIGS. 11 and 12) is the gap time on MPD_DATA bus 112 between two bursts of data transferring on the MPD_DATA bus 112. IFG is typically the MAC time for internal delay. The time is typically 0.5 us (25 cycles of PHY_CLK).

PHY layer 10 timing is now described. There are typically two time-critical paths between the RX burst to the TX burst in the PHY:

Path A: FFT to IFFT. The time between the FFT end processing the last symbol of the RX burst to starting IFFT for the first symbol (CE) of the TX burst; and Path B: RX data to TX data. The time between the last byte of the RX burst passing over interface 1 (see FIG. 1) to the first byte of the TX burst start transmitted over interface 1.

For Path A, time from the RX path through the FFT in addition to time from the IFFT to the TX path are typically accumulated. For Path B, all RX and TX path time in addition to the MPD_IFG are typically accumulated.

FIGS. 13 and 14 show examples of the RX path delay and TX path delay, respectively.

Figure 15:
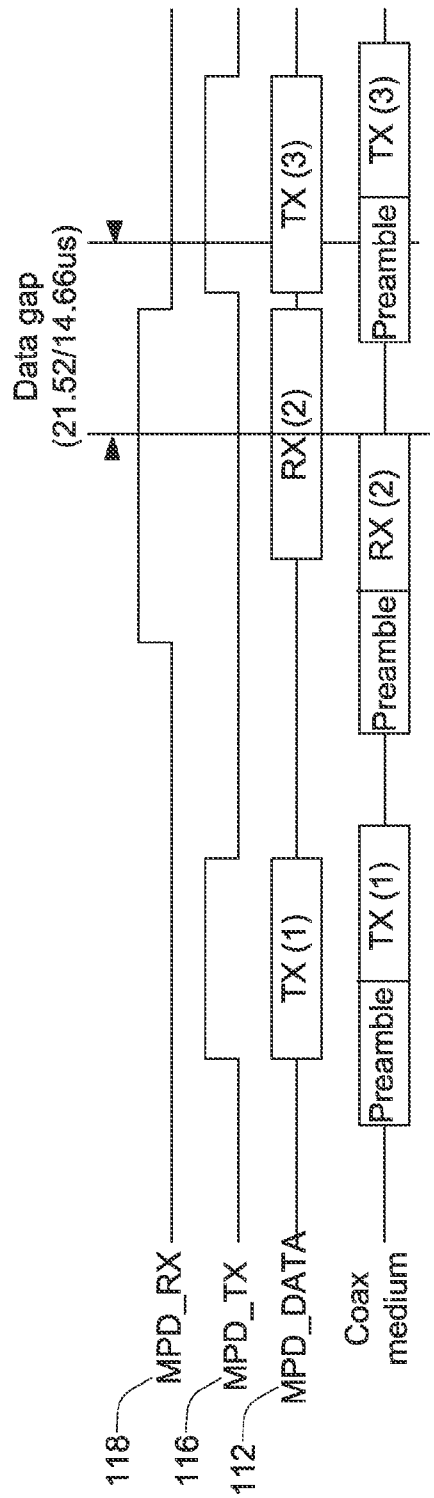
Figure 16:
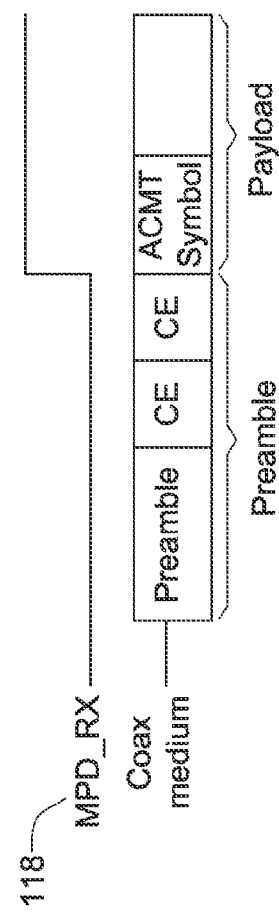

Referring again to the two data bursts that transfer on MPD_DATA bus 112, and as shown in FIG. 15, MPD_TX signal 116 is typically asserted by PHY layer 10 when the first data byte of TX burst TX(1) has been transferred over MPD_DATA bus 112 until the last byte of the burst. FIG. 16 shows that MPD_RX signal 118 is typically asserted from the start of the first data symbol (e.g., an Adaptive Constellation Multitone ("ACMT") symbol) received on the coax medium and until the transmission of the last byte of the RX burst on the MPD_DATA bus 112. MAC layer 20 typically detects the assertion of MPD_RX signal 118 and latches a Network Timer ("NT") for an Arrival Time Stamp ("ATS"). The ATS is typically used for comparing with a Transmit Start Time for synchronization of the NT to a Network Controller NT. MPD_RX signal 118 is typically de-asserted when the acquisition is finished and the two CE symbols have arrived within a tolerance defined by a predetermined number of samples. The time between the start preamble presented on the medium to the assertion of MPD_RX signal 118 typically depends on the preamble type and the CP.

Figure 17:
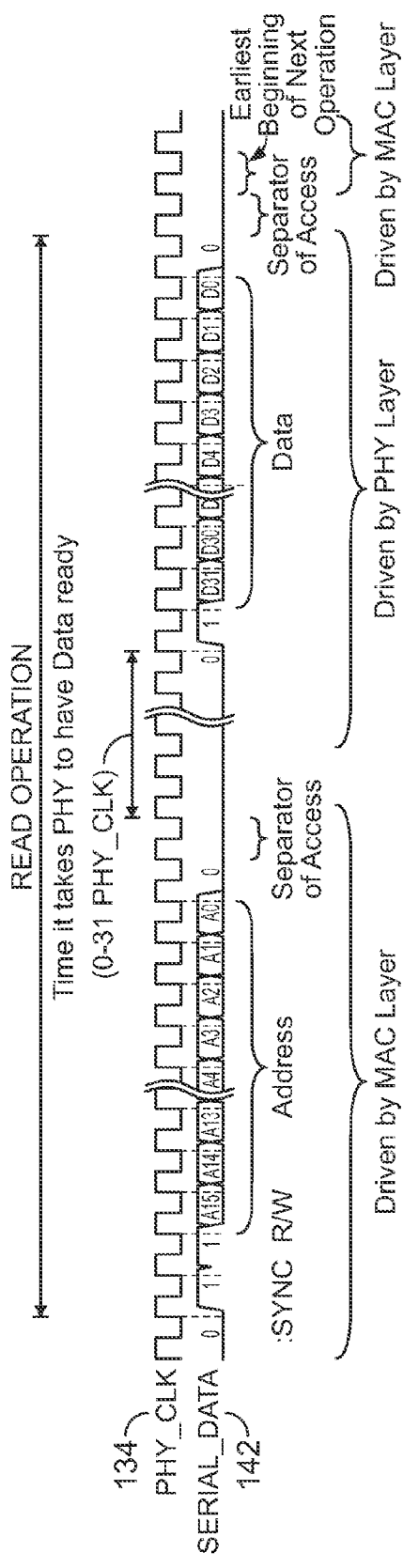

FIGS. 17-20 show features of an illustrative embodiment of configuration interface 140 (see FIG. 1). FIG. 17 illustrates a serial read operation in which MAC layer 20 drives the first part of the transaction, which includes a PHY register address. PHY layer 10 drives the second part of the transaction, which includes requested data. Whether MAC layer 20 or PHY layer 10 drives management interface 120, every bit driven on CNFG_SERIAL_DATA line 142 is always synchronized with PHY_CLK 134 (see FIG. 1). MAC layer 20 may drive a "1" as the first bit on CNFG_SERIAL_DATA line 142. The second bit is a "1", which indicates a read operation. MAC layer 20 may drive the next 16 bits, which store the PHY register address. After the 16-bit address, MAC layer 20 typically drives a '0' bit to place the CNFG_SERIAL_DATA line 142 in a known state.

PHY layer 10 may drive from 0 to 32 '0' bits on CNFG_SERIAL_DATA line 142 beginning on the second PHY_CLK 134 after MAC layer 20 stops driving interface 1 (see FIG. 1). PHY layer 10 may drive a '1' bit to indicate start of data followed by 32 data bits. The transaction is typically completed by driving a terminating '0' bit to place CNFG_SERIAL_DATA line 142 in a known state before releasing the line to be driven by MAC layer 20.

Figure 18:
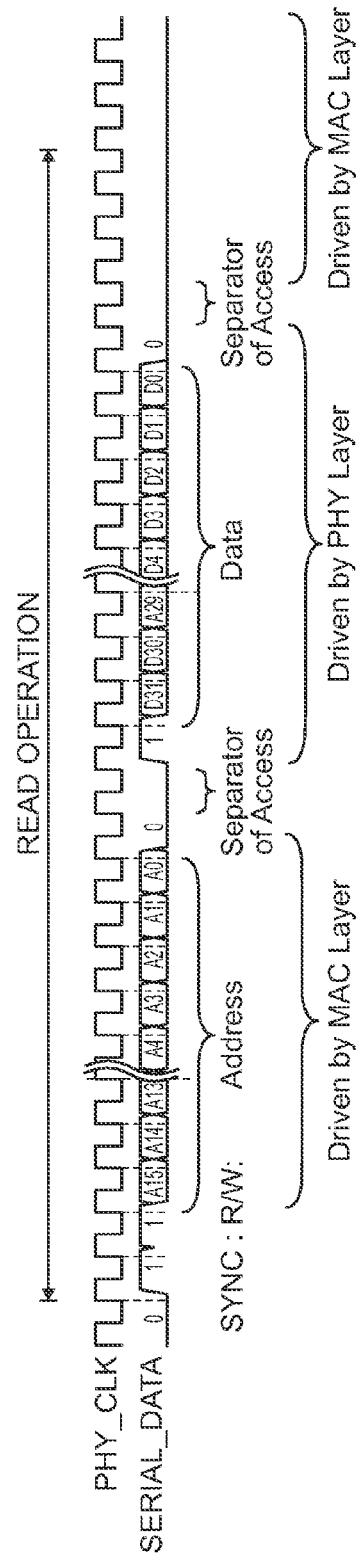

FIG. 18 shows typical timing for the fastest PHY layer 10 response to a read operation. An implementer may use internal or external pull-down resistors to set the CNFG_SERI-AL_DATA line 142 to 0 when MAC layer 20 is no longer driving the signal. CNFG_SERIAL_DATA pin 142 typically continues to be controlled by MAC layer 20.

FIG. 19 shows an illustrative serial write operation. For a serial write operation, MAC layer 20 typically drives the entire transaction. Each bit that MAC layer 20 drives on the CNFG_SERIAL_DATA line 142 is typically synchronized with PHY_CLK signal 134. MAC layer 20 typically drives a "1" as the first bit on CNFG_SERIAL_DATA line 142. The second bit is a "0", which indicates a write operation. The next 16 bits are typically the PHY layer 10 address location. The next 32 bits are typically the data to be written to the addressed PHY layer 10 register. At the end of 32-bits of data, MAC layer 20 typically drives a terminating "0." Once the transaction is complete MAC layer 20 typically stops driving management interface 120. An implementer can use, e.g., internal or external pull-down resistors to set the CNFG_SE-RIAL_DATA line 142 to 0 when MAC layer 20 is no longer driving the signal. CNFG_SERIAL_DATA line 142 typically continues to be controlled by MAC layer 20.

FIG. 20 shows the fastest timing for a read operation followed immediately by a write operation.

Figure 21:
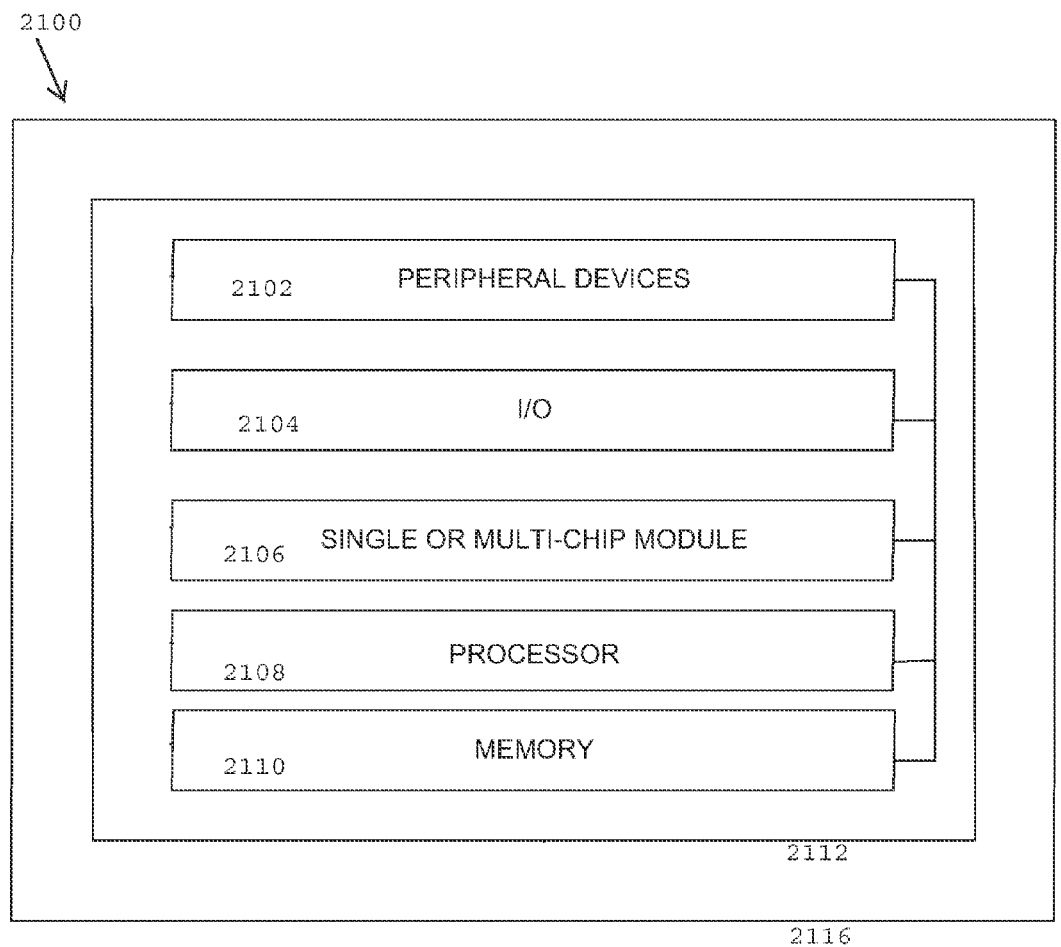
FIG. 21 shows a schematic diagram of an illustrative single or multi-chip device that may be used in connection with the interface of FIG. 1 in accordance with principles of the invention.

FIG. 21 shows a single or multi-chip module 2102 according to the invention, which can be one or more integrated circuits, in an illustrative data processing system 2100 according to the invention. Data processing system 2100 may include one or more of the following components: I/O circuitry 2104, peripheral devices 2106, processor 2108 and memory 2110. These components may be coupled together by a system bus or other interconnections 2112 and are disposed on a circuit board 2120 in an end-user system 2130 that may be in communication with a coax medium via an interface such as interface 1 (see FIG. 1).

For the sake of clarity, the foregoing description, including specific examples of parameter values provided, is sometimes specific to certain protocols such as those identified with the name MoCA™ and/or Ethernet protocols. However, this is not intended to be limiting and the invention may be suitably generalized to other protocols and/or other packet protocols. The use of terms that may be specific to a particular protocol such as that identified by the name MoCA™ or Ethernet to describe a particular feature or embodiment is not intended to limit the scope of that feature or embodiment to that protocol specifically; instead the terms are used generally and are each intended to include parallel and similar terms defined under other protocols.

It is appreciated that software components of the present invention including programs and data may, if desired, be implemented in ROM (read only memory) form, including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

What is claimed is:

1. A communication device, comprising:
   a first physical channel configured to transfer a first transmission parameter from a Media Access Control (MAC) layer to a first physical (PHY) layer; and
   the first PHY layer configured to:
      transmit the first transmission parameter over a second physical channel to at least one of a second PHY layer of a transmitting device or third PHY layer of a receiving device when the transmitting device and the receiving device are preparing to communicate with one another, wherein the transmission parameter comprises a bit loading table that indicates a number of bits to be loaded onto each of a plurality of tones by the transmitting device when communicating with the receiving device; and
      transmit a second transmission parameter over the second physical channel to at least one of the second PHY layer of the transmitting device or the third PHY layer of the receiving device, the second transmission parameter comprising a gain-per-tone table that indicates a transmission power for the plurality of tones.

2. The communication device of claim 1, wherein the third PHY layer of the receiving device receives the number of bits of at least one packet from the transmitting device on each of the plurality of tones that is indicated by the gain-per-tone table.

3. The communication device of claim 2, wherein a first number of bits of the at least one packet that are received on a first tone of the plurality of tones is different than a second number of bits that of the at least one packet that are received on a second tone of the plurality of tones.

4. The communication device of claim 2, wherein the third PHY layer receives the at least one packet over the plurality of tones at the transmission power indicated by the gain-per-tone table.

5. The communication device of claim 4, wherein a first transmission power of a first tone of the plurality of tones is different than a second transmission power of a second tone of the plurality of tones.

6. The communication device of claim 1, further comprising:
   a memory that stores the bit loading table and the gain-per-tone table, wherein the memory is external to the PHY layer.

7. The communication device of claim 6, wherein keys for accessing the bit loading table and the gain-per-tone table are stored at the MAC layer.

8. The communication device of claim 1, wherein the communication device is coupled to the receiving device and the transmitting device over a network, and the receiving device and the transmitting device are distinct from the communication device.

9. A communication device, comprising:
   a first physical channel for transferring at least one packet between a Media Access Control (MAC) layer and a physical (PHY) layer;
   the PHY layer configured to:
      receive a plurality of bit loading tables from another communication device over a second physical channel, wherein each of the plurality of bit loading tables indicates a number of bits of the at least one packet to be loaded onto each of a plurality of tones when transmitting the at least one packet to each of a plurality of receiving devices; and
      receive a gain-per-tone table from the another communication device, the gain-per-tone table indicating a transmission power for each of the plurality of tones when transmitting to at least one of the plurality of receiving devices; and
   a memory to store the plurality of bit loading tables and the gain-per-tone table, the memory being external to the PHY layer, wherein keys for accessing the plurality of bit loading tables are stored in the MAC layer; and wherein the PHY layer receives the at least one packet from the MAC layer and transmits, to one of the plurality of receiving devices, the number of bits of the at least one packet on each of the plurality of tones indicated by the one of the plurality of bit loading tables received from the one of the plurality of receiving devices.

10. The communication device of claim 9, wherein the number of bits of the at least one packet are transmitted on each of the plurality of tones at the transmission power indicated by the gain-per-tone table.

11. The communication device of claim 10, wherein a first number of bits of the at least one packet that are loaded on a first tone of the plurality of tones is different than a second number of bits of the at least one packet that are loaded on a second tone of the plurality of tones and a first transmission power of a first tone of the plurality of tones is different than a second transmission power of a second tone of the plurality of tones.

12. The communication device of claim 9, wherein the keys for accessing the at least one gain-per-tone table are stored at the MAC layer.

13. A method for transmitting packets by a first communication device, the method comprising:

receiving, from a second communication device, a first data item comprising a bit loading table that indicates transmission power for a plurality of tones when at least one packet is transmitted by a third communication device to the first-communication device over the plurality of tones and a second data item comprising a gain-per-tone table that indicates a number of bits to be loaded onto each of the plurality of tones when the at least one packet is transmitted by the third communication device to the first-communication device over the plurality of tones;

receiving, from the third communication device, the at least one packet over the plurality of tones, wherein the at least one packet is received by a physical (PHY) layer of the first communication device; and transferring the at least one packet from the PHY layer to a Media Access Control (MAC) layer over a second physical channel.

14. The method of claim 13, wherein receiving, from the third communication device, the at least one packet over the plurality of tones further comprises:

receiving, from the third communication device, the number of bits of the at least one packet on each of the plurality of tones that is indicated by the second data item.

15. The method of claim 14, wherein the bit loading table is determined based at least in part on the gain-per-tone table.

16. The method of claim 14, wherein a first number of bits of the at least one packet received on a first tone of the plurality of tones is different than a second number of bits of the at least one packet received on a second tone of the plurality of tones.

17. The method of claim 13, wherein a first transmission power indicated by the first data item for a first tone of the plurality of tones is different than a second transmission power indicated by the first data item for a second tone of the plurality of tones.

* * * * *